United States Patent Office 3,274,911
Patented Sept. 27, 1966

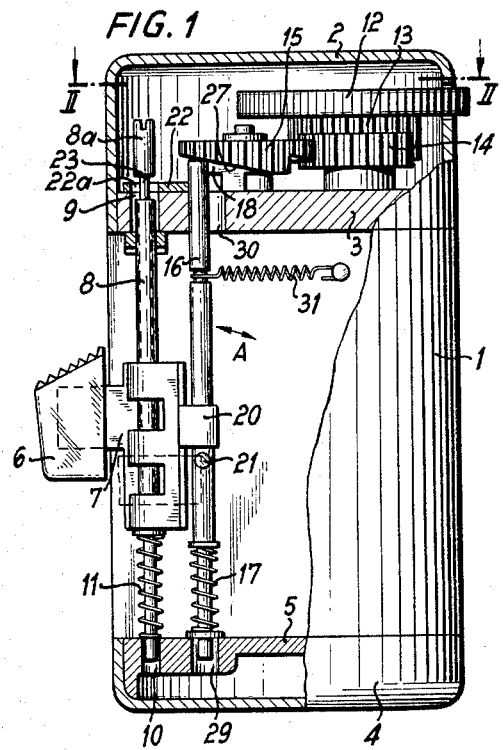

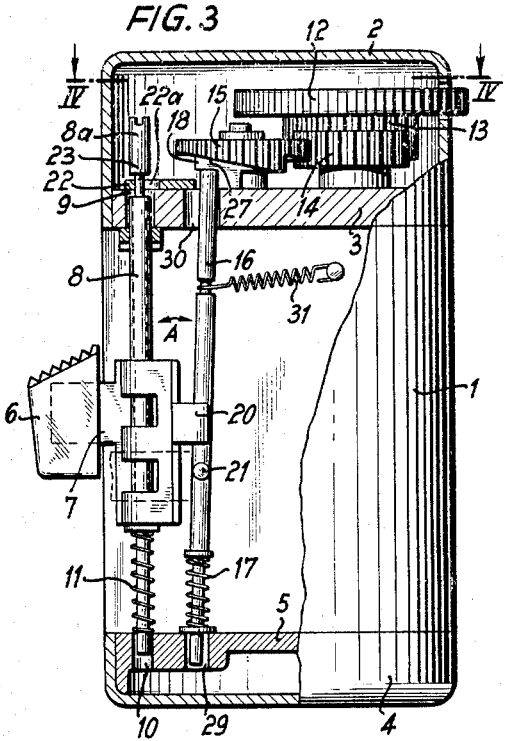
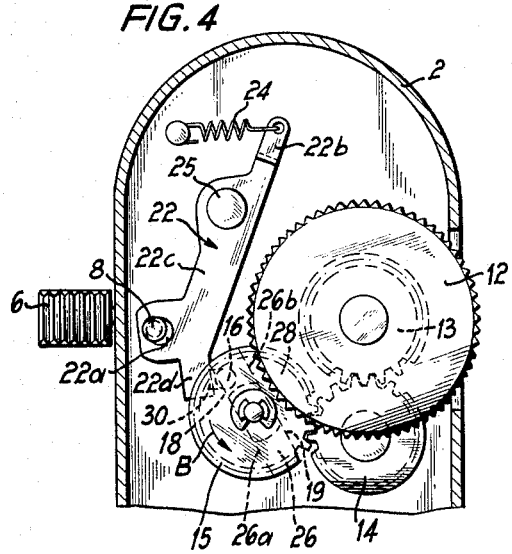

3,274,911
FILM-TRANSPORT AND SHUTTER-RELEASE
INTERLOCK MECHANISM FOR CAMERAS
Paul Greger and Heinz Rehn, Braunschweig, Germany,
assignors to Voigtlander A.G., Braunschweig, Germany
Filed Dec. 30, 1964, Ser. No. 422,211
Claims priority, application Germany, Jan. 10, 1964,
V 25,165
10 Claims. (Cl. 95—31)

The present invention relates to cameras.

More particularly, the present invention relates to still cameras where each frame is moved to a position to be exposed. Once an unexposed film frame is in proper position for exposure the shutter is actuated in order to make the exposure, and then the film transport structure is actuated to advance the next unexposed film frame into the picture-taking position. Of course, it is highly desirable to be able to prevent actuation of the shutter during the time when an exposed frame is being moved away from the picture-taking position and an unexposed frame is being moved into the picture-taking position, and in fact, it is undesirable to be able to operate the shutter release at any time after actuation of the shutter to make one exposure and before the next film frame is in a position for the next exposure. On the other hand, it is also highly desirable to be able to prevent operation of the film transport structure until after an unexposed frame has been exposed, and even then it is, of course, highly desirable to be able to operate the film transport structure in such a way that it can transport only the next unexposed frame into the picture-taking position, so that a film is not unnecessarily wasted.

It is already known to provide cameas with structures which will prevent actuation of the shutter release after exposure of a film frame has taken place and until the next unexposed frame is in position for exposure, and it is also known to provide cameras with structure which releases the film transport structure for operation only after an exposure has been made and which prevents operation of the film transport structure after the next film frame has been properly positioned for exposure, and it is furthermore known to interrelate these structures in such a way that the shutter release can only be actuated after the film transport structure has operated to advance the next unexposed frame to picture-taking position and to permit the film transport structure to be operated only after the shutter release has been actuated to make an exposure.

However, at the present time the relatively simple and inexpensive structures which are designed to accomplish these results do not operate reliably. Because of the inaccuracy in the manufacture of the parts as well as the wear to which they are subjected, it can and does happen that the shutter release can be actuated twice before a film frame is moved away from the picture-taking position, and also it can and does happen that the film transport structure is capable of transporting the film in the film-advincing direction, as distinguished from the film-rewinding direction, even if the shutter release structure is not actuated. These undesirable results are encountered with relatively simple and inexpensive structures because the synchronization between moving components must be very precise. If a projection on one component which is supported to be received in a groove of another component is not actually received in this groove because the projection arrives at a predetermined location a moment sooner or a moment later than the arrival of the groove at this location, then of course the desired results are not accomplished, and this is what is encountered in practice with relatively inexpensive structures of the above type. Of course, there are extremely complex and expensive structures which will indeed accomplish the desired result, but because of the large number of very precisely manufactured parts which are required for such structures, the cost of same prohibits their use in inexpensive cameras.

A further disadvantage of known structures of the above type resides in the fact that the film-transport locking mechanism limits the film-transport means to rotation only in the film-advancing direction for advancing unexposed film frames successively to the picture-taking position. In order to rewind the film it is necessary for the operator manually to disengage the film-transport lock structure, so that unless the operator remembers to effect the manual disengagement of the film-transport lock structure rewinding, or attempts to rewind the film while the film-transport structure is locked against rewinding can result in damage either to the camera or to the film or both.

Still another disadvantage of the known structure resides in the fact that the shutter release mechanism is locked in the shutter-releasing position. In other words, the shutter release structure has an initial position from which it is displaced by the operator in order to release the shutter, and ordinarily the shutter release will return to its release position after the exposure has been made. However, many known cameras prevent return of the shutter release to its initial position until after the next unexposed film frame has been advanced into the picture-taking position. The disadvantage of this type of construction resides in the fact that it is not possible to make time exposures where the operator wishes to maintain the shutter open manually for any length of time which the operator can determine himself. This operation for time-exposures, of course, requires that the operator be able to maintain the shutter release structure manually in the position where the shutter is maintained open, and if the camera is provided with a structure which locks the shutter against return to its initial position until after the next film frame is advanced into the picture-taking position, then, of course, such a camera cannot make time-exposures in this manner.

It is accordingly a primary object of the present invention to provide a camera with a relatively simple and inexpensive structure which will operate very precisely and reliably to produce the desired interaction between the shutter release and film-transporting structures.

It is furthermore an object of the present invention to provide a structure which will enable the film to be rewound at any time without requiring the operator to disengage a structure which locks the film-transport means against operation.

In addition, it is an object of the present invention to provide a structure which releasably locks the shutter release mechanism at the initial position of the shutter release mechanism from which the shutter release mechanism is displaced in order to make an exposure, so that with the shutter-release lock structure of the invention it is indeed possible to make time-exposures.

Primarily, with the structure of the invention as it relates to the interrelation between the lock structures for the shutter release and the film-transporting components, there is provided for the film-transport means a releasable film transport lock means, and for the shutter release means a releasable shutter-release lock means. In accordance with one of the features of the present invention, the shutter-release lock means and the film-transport lock means directly engage each other and the film transport lock means maintains the shutter-release lock means in its release position permitting shutter actuation when the film-transport lock means locks the film transport means against operation, while displacement of the film-transport lock means to a position releasing the film-transport means for operation automatically places the shutter release lock means in a position for locking the shutter release means against actuation. As a result of this direct engagement between the pair of lock means, it is possible for one of the lock means to directly determine the position of the other of the lock means, and thus the necessity of a train of motion transmitting elements which must very precisely cooperate with each other is completely eliminated.

The invention is illustrated by way of example in the accompanying drawings which form part of the application and in which:

FIG. 1 is a partly sectional elevation of a camera shown in FIG. 1 in a position where the film-transport means is blocked against operation, and FIG. 1 only shows sufficient structure to provide a full understanding of the invention;

FIG. 2 is a sectional plan view taken along line II—II of FIG. 1 in the direction of the arrows;

FIG. 3 shows the structure of FIG. 1 in the position which the parts take when the shutter release means is locked against operation; and FIG. 4 is a sectional plan view taken along lines IV—IV of FIG. 3 in the direction of the arrows.

Referring now to the drawings, the illustrated structure includes a camera housing 1 carrying an upper hollow cap member 2 and provided with an upper wall 3 over which the cap 2 is situated. The camera housing 1 also includes a lower wall 5 beneath which a lower cap 4 is situated. At the exterior of the camera is situated a shutter-releasing finger-piece 6 which may be engaged by the operator in order to bring about the release of the shutter. This finger-piece 6 is fixedly mounted on the outer end of a member 7 which extends into the interior of the camera where this member 7 is fixed to the elongated shutter-releasing rod 8. This rod 8 is guided for vertical movement in an opening 9 which is formed in the upper wall 3 and in an opening 10 which is formed in the lower wall 5. A spring 11 is coiled about a lower portion of rod 8 and engages the upper surface of the lower wall 5 as well as a collar which is fixed to the rod 8 so as to urge the latter upwardly to the position illustrated in FIG. 1 where the rod 8 is shown in its initial position before actuation of the shutter release means to make an exposure.

A train of gears 12–14 forms part of a known structure for transporting film in the camera, and it will be noted that part of the gear 12 is accessible at the exterior of the camera so that the operator can turn the gear 12 in order to actuate the film-transport means for transporting the film in the camera. Of course, the gear 12 is fixed with a pinion 13 which meshes on the gear 14, so that in this way the train of motion is transmitted to the known structure for transporting the film. Element 12 need not be a gear and instead can simply be any rotary disc having at its exterior periphery a knurled surface or the like enabling the operator conveniently to turn the element 12 for actuating the film-transport means.

A releasable film-transport lock means cooperates with the film-transport means, and this latter lock means includes a gear 15 which meshes with the gear 14 to be rotated thereby, this gear 15 forming a rotary toothed member of the releasable lock means. The film-transport lock means includes in addition to the rotary toothed member 15, an elongated locking rod 16 which is acted upon by a spring means so as to be urged upwardly as well as to tilt downwardly toward the right, as viewed in FIG. 1. This spring means includes a spring 17 coiled about a lower portion of rod 16, engaging the wall 5 and also engaging a collar fixed to the rod 16, so that the spring 17 urges the rod 16 upwardly. In addition, the spring means includes a spring 31 connected at one end site end to a stationary support so that the spring 31 to an intermediate portion of the rod 16 and at its opposite end urges the rod 16 to tilt about its bottom end toward the right, as viewed in FIG. 1. The bottom end of the rod 16 is received in an opening 29 of the wall 5, and this opening 29 is sufficiently great to permit the desired tilting of the rod 16, and in addition a guide means is provided for guiding the rod 16 for tilting movement in given plane which directs the top end of the rod 16 along a given path, and this guide means includes a part of the upper wall 3 which is formed with the elongated slot 30 through which the locking rod 16 extends.

The underside of the rotary tooth member 15, as viewed in FIG. 1, is the side of the latter which is provided with the teeth, and in the illustrated example the member 15 is provided with a pair of teeth which extend through the same angular distances about the axis of the rotary member 15. One of these teeth has a relatively steep surface 18 visible in FIG. 1 and situated substantially in a plane which is parallel to the axis of rotation of the member 15, and this tooth which includes the surface 18 also includes a flatter surface 28 which is not visible in FIG. 1 and which intersects the surface 18 to form the crest or tip of the tooth. The flatter surface 28 is inclined slightly with respect to a plane perpendicular to the axis of rotation of the rotary member 15. This surface 28 extends from the intersection with the surface 18 gradually upwardly, as viewed in FIG. 1, until the surface 28 joins the relatively steep surface 19 of the next tooth. This surface 19 is of the same construction as the surface 18 except that it is almost diametrically opposed thereto, as is apparent from FIG. 2. This second tooth which includes the surface 19 includes the flatter surface 27 shown in FIG. 1, this flatter surface 27 being inclined slightly with respect to a plane perpendicular to the axis of rotation of the rotary member 15, so that the surface 27 is identical with but situated opposite to and inclined oppositely to the surface 28. The surfaces 27 and 28, before they intersect the surfaces 19 and 18, respectively, smoothly merge into flat horizontal surface portions 26 which form end portions of the surfaces 27 and 28 at the ends thereof, which form the crests of the teeth. The intersection between the end portion 26 and the inclined part of surface 27 is indicated at 26a in FIG. 2, while the intersection between the inclined and horizontal portions of the surface 28 is indicated at 26b in FIG. 2. Thus, as the rotary member 15 turns in the direction of the arrow B shown in FIG. 2, it is possible for the upper end of the locking rod 16 to gradually move upwardly along surface 27 entering into the gap between the pair of teeth, and the rotary member 15 can turn until its relative steep surface 18 engages the upper end of the rod 16 and displaces the upper end of the rod 16 to the left end of the slot 30, as viewed in FIGS. 1 and 2, this left end of the slot 30 forming the end of the guide means which limits the movement of the rod 16 and which also limits the extent to which the film-transport means can be turned. It is to be noted that when the film-transport lock is in its locking position shown in FIGS. 1 and 2, the surface 18 extends across the path of movement provided for the rod 16 by the guide means 30. Furthermore, it is to be noted that the rotary member 15 is designed to cooperate with a transmission where one-half of the revolution of the rotary member 15 will correspond to the transportation of a full film frame to the picture-taking position. In a structure, where for example, a full revolution of a rotary member 15 is required to transport a film frame, only a single tooth would be provided, so that in this case the inclined surface which would correspond to the surface 27 or 28 would extend almost all the way around the rotary member joining the steep surface at one end thereof and the flat surface 26 at the crest of the tooth at the other end thereof.

The shutter-release rod 8 of the shutter-release means fixedly carries a motion-transmitting member 20 which extends over a pin 21 fixedly carried by the locking rod 16, and the position of the motion-transmitting member 20 with respect to the pin 21 is such that when the rod 8 has been depressed through actuation of the finger-piece 6, through a distance sufficient to release the shutter, then at the moment of shutter release the motion transmitting member 20 will have engaged the pin 21 and will have depressed the rod 16 through a distance sufficient to situate the top end of the rod 16 at an elevation just below the crest of the tooth so as to enable the spring 31 to move the rod 16 beneath and along the flat horizontal surface portion 26.

The shutter-release lock means of the invention includes a lever 22 supported by a pivot pin 25 for turning movement in a given plane in which the lever 22 is located, and this plane is the plane in which a cutout of the rod 8 is located when the rod 8 is in its initial position, so that an edge portion of the lever 22 can enter into this cutout, as will be apparent from the description which follows. Thus, it will be seen that the rod 8 has in its initial position shown in FIGS. 1 and 3, a cutout in the form of a groove 23 which extends all around the rod 8 and which is situated in the same plane as the lever 22, this plane being determined by the top of upper wall 3. The shutter-release lock means further includes a spring 24 shown most clearly in FIGS. 2 and 4, this spring urging the lock lever 22 to turn in a direction which will displace an edge portion of the lever 22 into the cutout 23 of the shutter-release means. The edge portion of the lever 22 which is received in the cutout 23 of the rod 8 is formed by part of an edge of an opening 22a which is formed in the lever 22 and through which the upper portion of the rod 8 extends.

As has been indicated above, one of the primary features of the present invention resides in providing direct engagement between the shutter-release lock means and the film-transport lock means, and thus it will be seen that in fact the lever 22 of the shutter release lock means is in direct engagement with the locking rod 16 of the film-transport lock means. The rod 16 forms a stop for the lever 22. Thus, in the position of the parts shown in FIG. 1, the spring 24 in fact tends to move an edge portion of the opening 22a into the cutout 23, but the location of the rod 16 at the left end of the slot 30 places this rod in a position where by engagement with the lever 22 the rod 16 itself prevents the spring 24 from displacing the lever 22 to its locking position. Thus, it is the locking rod 16 itself which directly coacts with the locking lever 22 to maintain the latter in its release position releasing the shutter for operation. As may be seen from FIG. 2, the lever 22 has a projection 22d which directly engages the rod 16. Of course, once the rod 16 is displaced to the right along the slot 30, it is possible for the spring 24 to displace an edge of the opening 22a into the cutout 23 of the rod 8. However, as soon as the locking rod 16 returns to its locking position, where this rod 16 is situated at the left end of the slot 30, as viewed in the drawings, then of course the locking rod 22 is necessarily in a position where it cannot lock the shutter-release means against operation.

As is apparent from FIG. 2, the lock lever 22 is in the form of a two-armed lever having one arm 22b connected with spring 24 and having its other arm 22c provided with the opening 22a as well as with the extension 22d which cooperates with the locking rod 16.

The above-described structure operates in the following manner:

The parts are shown in FIG. 1 where the camera is ready to make an exposure. Further actuation of the film-transport means is prevented by engagement of the upper end of the locking rod 16 with the relatively steep surface 18 of one of the teeth of the rotary member 15. Of course, the spring 31 is seeking to turn the rod 16 in a clockwise direction, as viewed in FIG. 1, at this time, but it cannot overcome the force of the film-transporting means. At this time, which is to say when the film-transport lock means locks the film-transport means against operation, the locking rod 16 situates the locking lever 22 of the shutter-release lock means in a position where the center of the opening 22a is substantially coincident with the axis of the rod 8, so that because of this alignment of the opening 22a with the rod 8, it is possible for the rod 8 to be axially advanced upon depression of the finger-piece 6. Therefore, in order to make an exposure the operator will depress the finger-piece 6, and of course the cutout 23 will move below the lever 22 while the upper end portion 8a of the rod 8 will be situated in the opening 22a. As the rod 8 reaches the end of its stroke, the motion-transmitting member 20 by engagement with the pin 21 has displaced the rod 16 downwardly in opposition to the spring 17, and when the rod 8 has reached it lowermost position where the shutter is actuated, the upper end of the locking rod 16 also reaches the position where it can be displaced across the crest of the tooth which is formed by the surfaces 28 and 18, so that the spring 31 immediately tilts the rod 16 so that its upper end engages the flat surface portion 26 just to the left of the intersection 26b shown in FIG. 2 between the flat surface portion 26 and the inclined surface portion of the flatter surface 28 of the tooth 18, 28. At this time the edge of the opening 22a will only engage the upper portion 8a of the rod 8, this upper portion being situated above the cutout 23, so that the lever 22 additionally cannot follow the movement of the rod 16 across the crest of the holding tooth of the rotary member 15. However, when the operator releases the finger-piece 6, the spring 11 returns the rod 8 to its initial position where the cutout 23 is situated in the same plane as the lever 22 and now the edge portion of the opening 22a can enter into the cutout 23 so that the parts will have the position indicated in FIGS. 3 and 4. Of course, it is the spring 24 which turns the lever 22 at this time so as to place the shutter-release lock means in its locking position locking the shutter-release means against operation. Of course, the rod 16 could not move upwardly when the rod 8 moved upwardly, because the top end of the rod 16 was engaged by the surface 26 referred to above, and thus the motion-transmitting member 20 simply moves upwardly away from the pin 21 at this time. Thus, as soon as the shutter release means returns to its rest position, the shutter-release lock means acts to lock the shutter release means against a second actuation, and this is the position of the parts shown in FIGS. 3 and 4.

The operator will now turn the wheel 12 in order to advance the next film frame into position to be exposed, and as a result the gear or rotary tooth member 15 is turned in the direction of the arrow B, so that the top end of the rod 16 gradually moves upwardly as progressive portions of the surface 28 ride along the top end of the rod 16. Finally, the surface 19 will reach the position of the surface 18 shown in FIG. 2, so that the rod 16 will be displaced back to the position shown in FIGS. 1 and 2. As a result, the locking rod 16 by its engagement with the lever 22 will turn the latter in opposition to the spring 24 in a clockwise direction to the position illustrated in FIGS. 1 and 2, where the edge portion of the opening 22a is again out of the cutout 23 so that the operator can actuate the shutter release means. Thus, the parts are again in a position to make the next exposure.

It is to be noted, from FIGS. 1 and 2 that when the film-transport lock means locks the film-transport means against operation in a film-advancing direction, it is nevertheless possible at any time to operate the film transport means in the reverse direction for rewinding the film. Thus, it will be seen that if the rotary member 15 is turned in a direction opposite to that indicated by the arrow B, the teeth will simply ride past the upper end of the rod 16 depressing the latter gradually and the rod 16 will simply snap up as a crest of the tooth rides across the top end of the rod 16, so that at this time, the steep surfaces 18 and 19 always move away from the rod 16, when they are in an overlapping relationship with respect to the rod 16, and therefore with the structure of the invention rewinding of the film is possible at any time and the operator need not manipulate any parts such as by placing a lock structure in a release position for releasing the film-transport structure for rewinding the film.

Furthermore, it is to be noted that because the rod 8 is locked only when it has returned to its initial position, it is possible with the structure of the invention to provide a time-exposure where the operator maintains the rod 8 at its lowermost position to manually maintain the shutter open for a length of time determined solely by the operator and not by any mechanical structure connected to the camera. It is furthermore to be noted that the structure of the invention is quite simple. The edge of the lever 22 simply engages an exterior surface of the rod 16. The rod 16 does not have to be provided with any special surfaces of a special inclination and precise construction required to cooperate precisely with the lock lever 22.

Of course, certain variations are possible with the structure of the invention. For example, if it is decided to eliminate the advantage of rewinding of the film at any desired time without any preparations for this purpose, then instead of teeth for the member 15 as described above, it is possible to use simple grooves for receiving the top end of the rod 16, although here again, these grooves would have to extend across the slot 30 to enable the top end of the rod 16 to move past an edge of such groove when the film-transport lock means is placed in its release position. Furthermore, the pair of springs 17 and 31 could be replaced by a single spring which urges the locking rod 16 upwardly and to the right, as viewed in FIG. 1. Also the edge portion of the lever 22 which cooperates with the cutout 23 need not be an edge of an opening such as the opening 22a. Any part of the side edge of the lever 22 can cooperate with the cutout 23. Of course, if one wishes to sacrifice the possibility of providing time exposures, then it is of course possible to releasably hold the shutter release rod 8 against operation in the lowermost position of this rod where it releases the shutter. Moreover, instead of providing a laterally extending a laterally extending member 7 carrying the finger-piece 6 for actuation of the rod 8, the rod 8 could be extended upwardly to be actuated from the top of the camera by a button accessible to the operator at the top of the rod 8. It is also possible to provide a construction where the rod 16 is guided only for vertical movement along its own axis and where it is provided with an inclined top surface with which the edge of the lever 22 cooperates so that when the rod 8 is depressed the rod 16 would be lowered and the inclined surface at the top end of the rod 16 would permit the lever 22 to turn in a counter-clockwise direction about the pivot 25, as viewed in FIG. 2, so that in this way the lever 22 would be released for movement to its locking position. However, this construction would require locking the rod 8 in its lowermost position, so that time exposures could not be provided, and in addition, it would be necessary to properly orient the rod 16 so that its inclined top end would always have a proper attitude with respect to the edge of the lever 22. It is therefore apparent that with the simpler structure of the present invention where the lever 22 simply cooperates with an exterior side surface of the rod 16 which does not have to have any particular precise orientation or manufacture, far better results are achieved so that the construction shown in the drawing and described above is indeed preferable to an arrangement where the rod 16 only moves axially and has an inclined surface at its top end to cooperate with the lever 22, but it is to be understood that this latter type of construction could possibly achieve the basic results of the present invention and therefore is to be included in the present invention. It will be noted that even with the construction where inclined top end surface of the rod 16 cooperates with the lever 22, these elements still directly engage each other to provide the direct cooperation between the pair of lock means which is indicated above as being one of the primary features of the present invention.

What is claimed is:

1. In a camera, film transport means for transporting film in the camera, shutter release means for releasing a shutter of the camera, releasable film transport lock means having a locking position preventing operation of said film transport means to transport film in a direction displacing unexposed film to a position to be exposed, and said film transport lock means having a release position releasing said film transport means for transporting the film in said direction, and releasable shutter release lock means having a locking position preventing operation of said shutter release means and a release position releasing said shutter release means for operation, said film transport lock means and said shutter release lock means directly engaging each other and said film transport lock means when in its locking position maintaining said shutter release lock means in its release position releasing said shutter release means for operation, said shutter release lock means assuming its locking position when said film transport lock means is in its release position releasing said firm transport means for transporting film in said direction, and said film transport means displacing said film transport lock means back to said locking position thereof at the end of the transportation of an unexposed film frame to a position to be exposed, said film transport lock means, when returning to its locking position, displacing said shutter release lock means to its release position releasing said shutter release means for operation.

2. In a camera as recited in claim 1, said film transport lock means when in its locking position releasing said film transport means for movement in a direction which rewinds exposed film.

3. In a camera as recited in claim 1, said shutter release means having an initial position from which it is displaced in order to release the shutter of the camera, and said shutter release lock means locking said shutter release means against operation only when said shutter release means has returned to said initial position thereof.

4. In a camera as recited in claim 3, said shutter release lock means including a lever turnable in a given plane, and said shutter release means including a rod movable through said plane and formed with a cutout which is situated at said plane when said shutter release means is in said initial position thereof, and a spring acting on said lever for urging an edge portion thereof into said cutout of said rod, said film transport lock means engaging said lever to maintain said edge portion thereof out of said cutout except when said film transport lock means is in said release position thereof releasing said film transport means for operation.

5. In a camera as recited in claim 1, said film transport lock means including a rotary lock member operatively connected with said film transport means to be rotated upon actuation of said film transport means, said rotary lock member having a surface formed with at least one tooth defined by a relatively steep surface situated substantially in a plane parallel to the axis of rotation of said rotary member and a flatter surface which is inclined to a relatively small degree with respect to a plane perpendicular to said axis and which intersects said relatively steep surface to form the crest of said tooth, and said releasable film transport lock means including a locking rod having an end engaging said tooth and a spring urging said end of said locking rod into engagement with said tooth, said film transport means during transportation of film in said direction turning said rotary member in a direction which displaces said flatter surface of said tooth along said end of said locking rod while said relatively steep surface of said tooth approaches said locking rod, and the engagement of said steep surface with said locking rod preventing further rotation of said rotary member and thus preventing further operation of said film transport means in said direction.

6. In a camera as recited in claim 5, said film transport lock means including a guide guiding said locking rod not only for movement into engagement with said tooth but also for tilting movement in a given plane displacing said end of said rod along a predetermined path, said crest of said tooth when said steep surface thereof engages said rod extending across said path so that said end of said rod when moving along said path will move across said crest of said tooth away from said relatively steep surface thereof, and means carried by said shutter release means and displacing said rod of said film transport lock means to a position where said end of said locking rod moves across said crest of said tooth at the moment when said shutter release means has reached a position releasing the shutter of the camera, whereby said locking rod then moves away from said relatively steep surface to release said film transport means for operation.

7. In a camera, film transport means for transporting an unexposed film frame to a position to be exposed, shutter release means including an elongated rod formed with a cutout located in a given plane when said shutter release means is in an initial position from which it is displaced in order to release the shutter, a lever turnable in said plane and having an edge portion adapted to enter into said cutout for preventing displacement of said shutter release means from said initial position, spring means operatively connected to said lever for urging the latter to turn in a direction which will displace said edge portion thereof into said cutout, a rotary toothed member driven by said film transport means and having at least one tooth defined by a relatively steep surface located substantially in a plane parallel to the axis of rotation of said rotary member and a flatter surface inclined to a small degree with respect to a plane perpendicular to said axis, said flatter surface intercepting said steep surface at the crest of said tooth, an elongated locking rod extending substantially parallel to said rod of said shutter release means and having an end engaging said rotary toothed member, guide means guiding said locking rod for tilting movement in a given plane, said relatively steep surface of the said tooth engaging said locking rod and displacing the latter to an end of said guide means to prevent further operation of said film transport means in a direction which displaces an unexposed film frame to a position for exposure, spring means acting on said locking rod means for urging said end thereof against said tooth and for urging said locking rod to tilt in said given plane away from said end of said guide means, said crest of said tooth extending, when said locking rod is at said end of said guide means across said given plane so that said end of said locking rod is displaced by said spring means across the crest of said tooth so as to displace said locking rod away from said relatively steep surface to release said film transport means for operation, motion transmitting means carried by said shutter release means and acting on said locking rod to displace said end thereof to the elevation of said crest of said tooth at the moment when the shutter is released by said shutter release means, whereby at the moment of shutter release said spring means can displace said locking rod across said crest of said tooth to release said film transport means for operation, and said rotary tooth member upon turning through angle sufficient for displacement an unexposed film frame to a position for exposure displacing a steep surface of said tooth into engagement with said locking rod to displace the latter back to said end of said guide means at the end of the transporting of a film frame, so that said rotary toothed member and locking rod again cooperate to prevent further operation of said film transport means, said locking rod directly engaging said lever and turning the latter in opposition to said spring which acts on said lever to a position where said edge portion of said lever is displaced from said cutout of said rod of said shutter release means when said locking rod returns to said end of said guide means, whereby said shutter release means is released for operation only upon completion of the transportation of a new film frame into a position for exposure while said film transport means is released for operation only after an exposure has been made.

8. In a camera as recited in claim 7, said guide means including a wall of a camera housing formed with a slot through which said locking rod extends.

9. In a camera as recited in claim 8, said wall of said housing supporting said lever for turning movement in the plane at which the cutout of said rod of said shutter release means is located when said shutter release means is in said initial position thereof.

10. In a camera as recited in claim 9, said edge portion of said lever forming part of an opening which is formed in said lever and said rod of said shutter release means extending through said opening, said cutout of said rod being in the form of an annular groove formed in said rod.

References Cited by the Examiner

UNITED STATES PATENTS

| | | | |
|---|---|---|---|
| 2,227,964 | 1/1941 | Drotning et al. | 95—31 |
| 2,507,156 | 5/1950 | Harvey | 95—31 |
| 2,727,447 | 12/1955 | Bolsey | 95—31 |

NORTON ANSHER, *Primary Examiner.*

V. A. SMITH, *Assistant Examiner.*